United States Patent
Kataoka et al.

(10) Patent No.: US 8,919,196 B2
(45) Date of Patent: Dec. 30, 2014

(54) LIQUID STATE DETECTION SENSOR

(75) Inventors: Chiaki Kataoka, Aichi-gun (JP); Masaki Akagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/515,947

(22) PCT Filed: Jan. 14, 2011

(86) PCT No.: PCT/JP2011/050577
§ 371 (c)(1),
(2), (4) Date: Jun. 14, 2012

(87) PCT Pub. No.: WO2012/095996
PCT Pub. Date: Jul. 19, 2012

(65) Prior Publication Data
US 2013/0283905 A1    Oct. 31, 2013

(51) Int. Cl.
*G01F 23/26*    (2006.01)

(52) U.S. Cl.
CPC .......... *G01F 23/263* (2013.01); *G01F 23/266* (2013.01); *G01F 23/268* (2013.01)
USPC ...................................... 73/304 C

(58) Field of Classification Search
CPC .................... G01F 23/266; G01F 23/263
USPC ......................................... 73/304 C
See application file for complete search history.

(56) References Cited

U.S. PATENT DOCUMENTS

| | | | |
|---|---|---|---|
| 5,722,290 A | 3/1998 | Kronberg | |
| 6,539,797 B2 * | 4/2003 | Livingston et al. | 73/304 C |
| 8,474,315 B2 * | 7/2013 | Ohshima et al. | 73/304 C |
| 2010/0071459 A1 * | 3/2010 | Kamm et al. | 73/304 C |
| 2010/0154534 A1 * | 6/2010 | Hampton | 73/304 C |
| 2011/0120219 A1 * | 5/2011 | Barlesi et al. | 73/304 C |

FOREIGN PATENT DOCUMENTS

| | | |
|---|---|---|
| DE | 101 61 918 A1 | 6/2003 |
| JP | A-53-135363 | 11/1978 |
| JP | A-59-31418 | 2/1984 |
| JP | A-2007-120962 | 5/2007 |
| JP | A-2009-73206 | 4/2009 |

(Continued)

OTHER PUBLICATIONS

Nov. 18, 2013 Chinese Office Action issued in Chinese Application No. 201180005679.8 (with partial translation).
Peng et al., "Electrical Capacitance Tomography: State of the Art," *Imaging Technology*, 2005, No. 2, pp. 12-17 (with abstract).
May 7, 2013 Office Action issued in Japanese Patent Application No. 2011-554299 (with partial translation).

(Continued)

*Primary Examiner* — Hezron E Williams
*Assistant Examiner* — David Z Huang
(74) *Attorney, Agent, or Firm* — Oliff PLC

(57) ABSTRACT

A liquid state detection sensor capable of detecting a large number of objects with a small number of terminals. The liquid state detection sensor is provided with three terminals A to C, a capacitor C1 between terminals A and B, a capacitor C2 between terminals B and C, and a capacitor C3 between terminals A and C. The capacitor C1 and the capacitor C2 are connected in series, and the capacitor C3 is connected in parallel with this series connection. The capacitor C1 is disposed outside liquid fuel in a fuel tank, the capacitor C2 is partially or wholly immersed in the fuel in the fuel tank, and the capacitor C3 is disposed close to a floor of the fuel tank.

6 Claims, 11 Drawing Sheets

(56) References Cited

FOREIGN PATENT DOCUMENTS

| | | | | |
|---|---|---|---|---|
| JP | A-2010-25782 | 2/2010 | | |
| JP | A-2010-210307 | 9/2010 | | |
| WO | WO 2008064500 A2 * | 6/2008 | ............ | G01D 3/036 |

OTHER PUBLICATIONS

Feb. 15, 2011 International Search Report issued in International Patent Application No. PCT/JP2011/050577 (with translation).

Apr. 28, 2014 Office Action issued in German Patent Application No. 112011104716.9 (w/ English Translation).

\* cited by examiner

FIG.4

| A | B | C | CAPACITANCE BETWEEN THE TERMINALS |
|---|---|---|---|
| ○ | ○ |   | $C_{AB} = \dfrac{C2C3}{C2+C3} + C1$ |
|   | ○ | ○ | $C_{BC} = \dfrac{C1C3}{C1+C3} + C2$ |
| ○ |   | ○ | $C_{AC} = \dfrac{C1C2}{C1+C2} + C3$ |

FIG.8
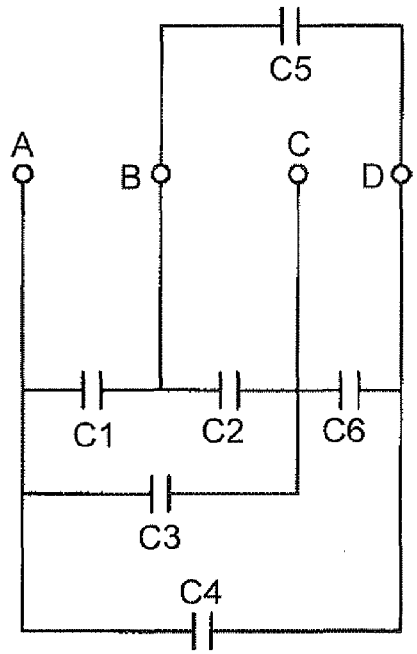
⇩ A – B CIRCUIT DIAGRAM
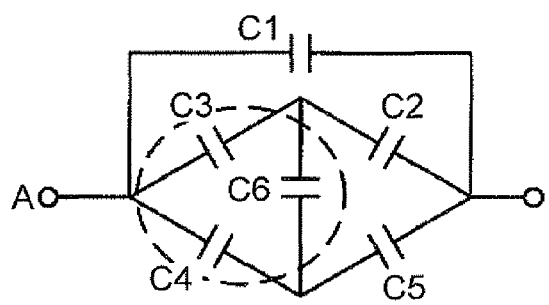
⇩ ◯ Δ–Y CONVERSION OF CIRCLED AREA
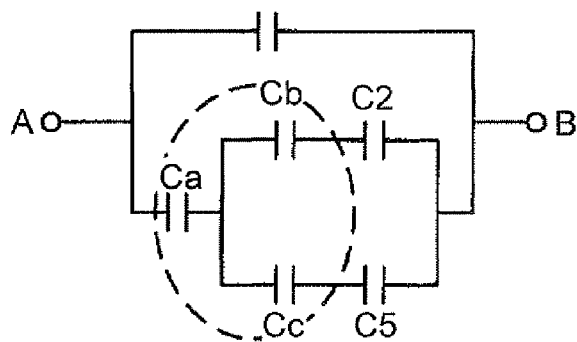

FIG.9

| MEASUREMENT PORTION / DETECTION OBJECT | VAPOR LAYER REFERENCE MEASUREMENT PORTION | LIQUID LEVEL MEASUREMENT PORTION | FUEL REFERENCE MEASUREMENT PORTION | TEMPERATURE MEASUREMENT PORTION | SUPPLIED FUEL CHARACTERISTIC MEASUREMENT PORTION | PRESSURE MEASUREMENT PORTION |
|---|---|---|---|---|---|---|
| (1) REMAINING FUEL AMOUNT | ○ | ○ | ○ | | | |
| (2) FUEL CHARACTERISTIC (TANK) | | | ○ | ○ | | |
| (3) FUEL CHARACTERISTIC (SUPPLIED FUEL) | | | | ○ | ○ | |
| (4) FILTER CLOGGING | | | | | | ○ |

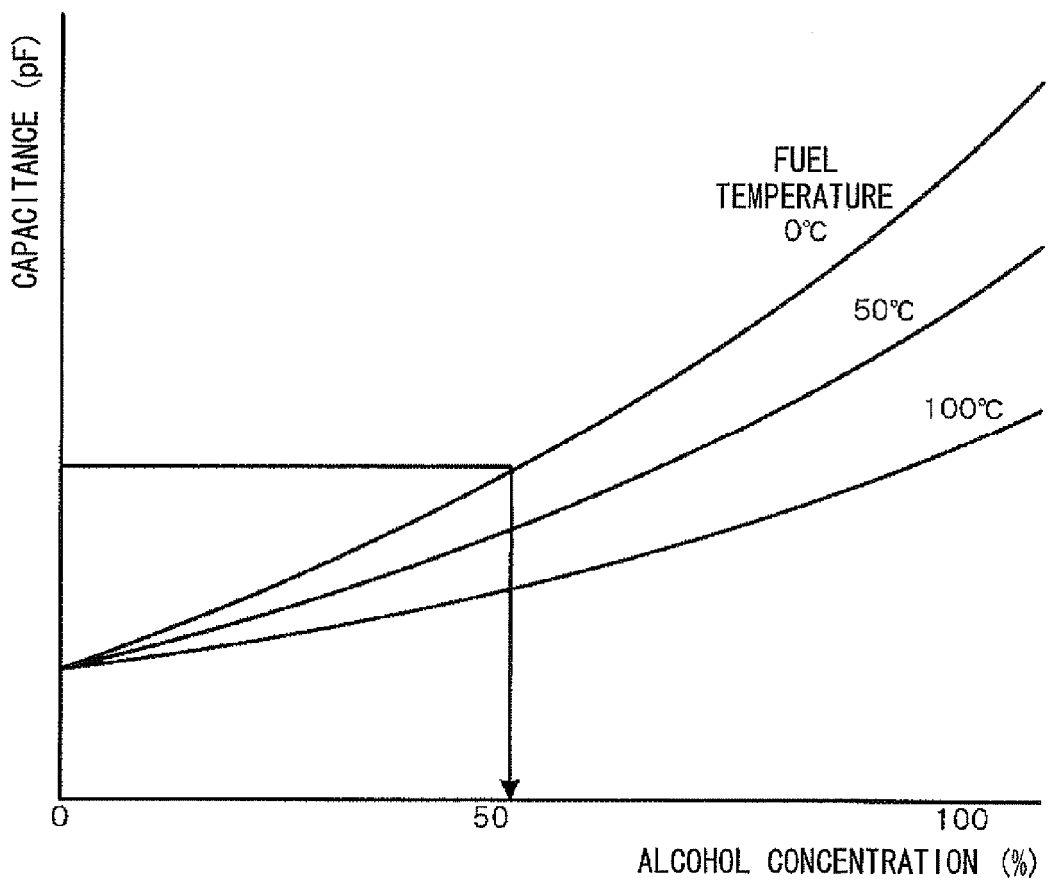

LIQUID STATE DETECTION SENSOR

TECHNICAL FIELD

The present invention relates to a liquid state detection sensor, and particularly relates to a liquid state detection sensor that is provided in a tank that stores a liquid, such as a fuel tank or the like, and that is capable of detecting plural kinds of state of the liquid.

BACKGROUND ART

A liquid state detection sensor that, for example, is provided in a fuel tank and detects a remaining fuel amount in the fuel tank is generally known.

As this kind of fuel state detection sensor, for example, the technology recited in Japanese Patent Application Laid-Open (JP-A) No. 2010-25782 has been proposed. For this technology, a sensor is proposed in which a first detection electrode, which is in a measured liquid, a second detection electrode, which measures a liquid level of the measured liquid, and a third detection electrode, which is permanently outside the measured liquid, are provided, and operations of charging a capacitor for a duration proportional to the length of a region in which the second detection electrode is immersed in the measured liquid and discharging the capacitor for a duration proportional to the length of a region in which the second detection electrode is outside the measured liquid are repeated.

SUMMARY OF INVENTION

Technical Problem

However, in the technology recited in JP-A No. 2010-25782, each detection electrode is constituted by a combination of a first terminal and another terminal. Therefore, terminals to the number of (the number of detection electrodes+1) are required.

The present invention has been made in consideration of the situation described above, and an object of the present invention is to provide a liquid state detection sensor that is capable of detecting a large number of objects with a small number of terminals.

Solution to Problem

In order to achieve the object described above, a first aspect of the invention includes: n terminals, n being a natural number that is at least 3; and at least n capacitance measurement portions provided between the terminals of respectively different combinations of the terminals.

According to claim 1 of the invention, there are n of the terminals, and at least n of the capacitance measurement portions are provided between the terminals of the respectively different combinations of terminals. Thus, measurement of at least n objects by the capacitance measurement portions is possible, and a greater number of detection objects may be detected with a small number of terminals than if the present configuration is not employed. Of the at least n objects, objects that are the same may be measured and objects that are different may be measured.

For example, as in claim 2 of the invention, the capacitance measurement portions are provided between all combinations of the terminals, $\{n!/(2\times(n-2)!)\}$ of the capacitance measurement portions being provided. Thus, a maximum number of detection objects may be detected with a small number of terminals.

Further, as in claim 3 of the invention, the capacitance measurement portions may include: a first capacitance measurement portion that is permanently disposed within a measured liquid in a fuel tank; a second capacitance measurement portion that is for measuring a liquid level of the measured liquid; and a third capacitance measurement portion that is permanently disposed outside the measured liquid. Therefore, a capacitance for inside the liquid may be measured with the first capacitance measurement portion and a capacitance for outside the liquid may be measured with the third capacitance measurement portion. Hence, by reference to measurement results of the first and third capacitance measurement portions, liquid levels may be accurately detected from measurement results of the second capacitance.

As in claim 4 of the invention, the capacitance measurement portions may further include a fourth capacitance measurement portion that is disposed at a liquid layer that is formed at the fuel tank for temporarily storing supplied fuel. With this configuration, a type of stored fuel may be detected with the fourth capacitance measurement portion.

As in claim 5 of the invention, the capacitance measurement portions may further include a fifth capacitance measurement portion that detects a temperature of fuel in the fuel tank.

As in claim 6 of the invention, a calculator may be further provided that memorizes pre-specified relationships between capacitances measured by the fifth capacitance measurement portion, temperatures of the fuel, and alcohol concentrations contained in the fuel, finds a temperature of the fuel on the basis of a capacitance measured by the fifth capacitance measurement portion, and calculates an alcohol concentration on the basis of the found temperature of the fuel and the capacitance measured by the fifth capacitance measurement portion.

As in claim 7 of the invention, the capacitance measurement portions may further include a sixth capacitance measurement portion that detects a pressure from a change in capacitance due to a change in separation between a pair of terminals.

As in claim 8 of the invention, the capacitance measurement portions are disposed on the same board.

According to the present invention as described hereabove, there is an advantageous affect in that a large number of liquid state objects may be detected with a small number of terminals.

BRIEF DESCRIPTION OF DRAWINGS

FIG. 4 is a table showing expressions representing capacitances between respective terminals of the liquid state detection sensor relating to the first exemplary embodiment of the present invention.

FIG. 8 is a diagram for explaining a method of calculating a capacitance between terminals A and B of the liquid state detection sensor relating to the second exemplary embodiment of the present invention.

FIG. 9 is a table showing correspondences between detection objects that can be detected by the liquid state detection sensor relating to the second exemplary embodiment of the present invention and measurement portions of the liquid state detection sensor.

FIG. 11 is a graph illustrating an example of relationships between capacitance and alcohol concentration.

DESCRIPTION OF EMBODIMENTS

Herebelow, examples of embodiments of the present invention are described in detail with reference to the drawings.

First Exemplary Embodiment

Figure 1:
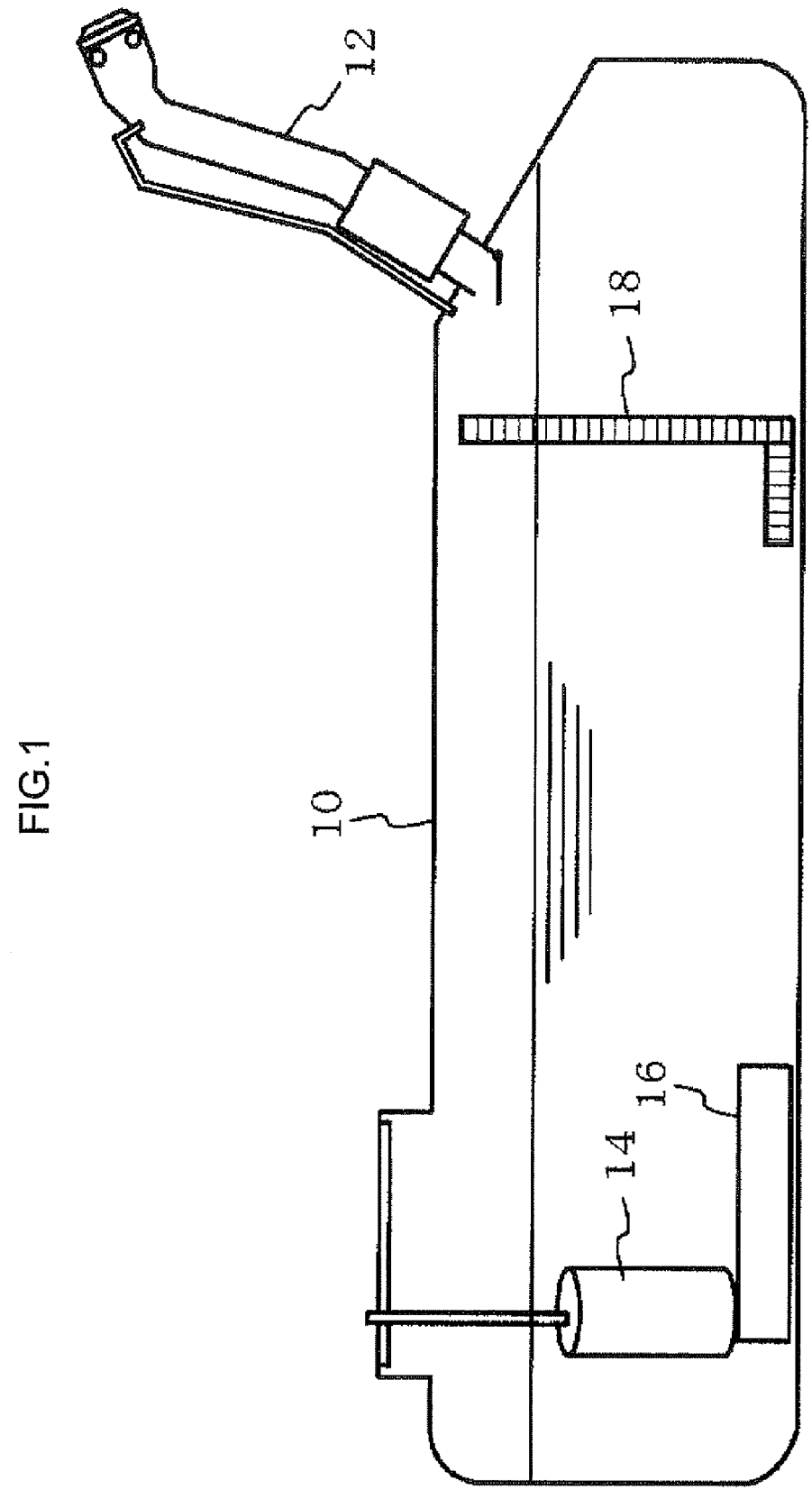
FIG. 1 is a diagram illustrating schematic structure of a fuel tank provided with a liquid state detection sensor relating to a first exemplary embodiment of the present invention.

FIG. 1 is a diagram illustrating schematic structure of a fuel tank provided with a liquid state detection sensor relating to the first exemplary embodiment of the present invention.

A fuel tank 10 stores fuel in liquid form to be used in an automobile or the like. The fuel stored in the fuel tank 10 is supplied through a fuelling pipe 12 that is connected to the fuel tank 10. The fuel stored in the fuel tank 10 is drawn up through a fuel pump 14 provided in the fuel tank 10 and supplied to an internal combustion engine such as an automobile engine or the like.

A filter 16 is provided at the fuel pump 14. By the fuel being drawn up through the filter 16, clogging of the fuel pump 14 or the like is suppressed.

A liquid state detection sensor 18 relating to the first exemplary embodiment of the present invention is disposed in the fuel tank 10. In the present exemplary embodiment, the liquid state detection sensor 18 detects remaining amounts of the fuel stored in the fuel tank 10.

Figure 2:
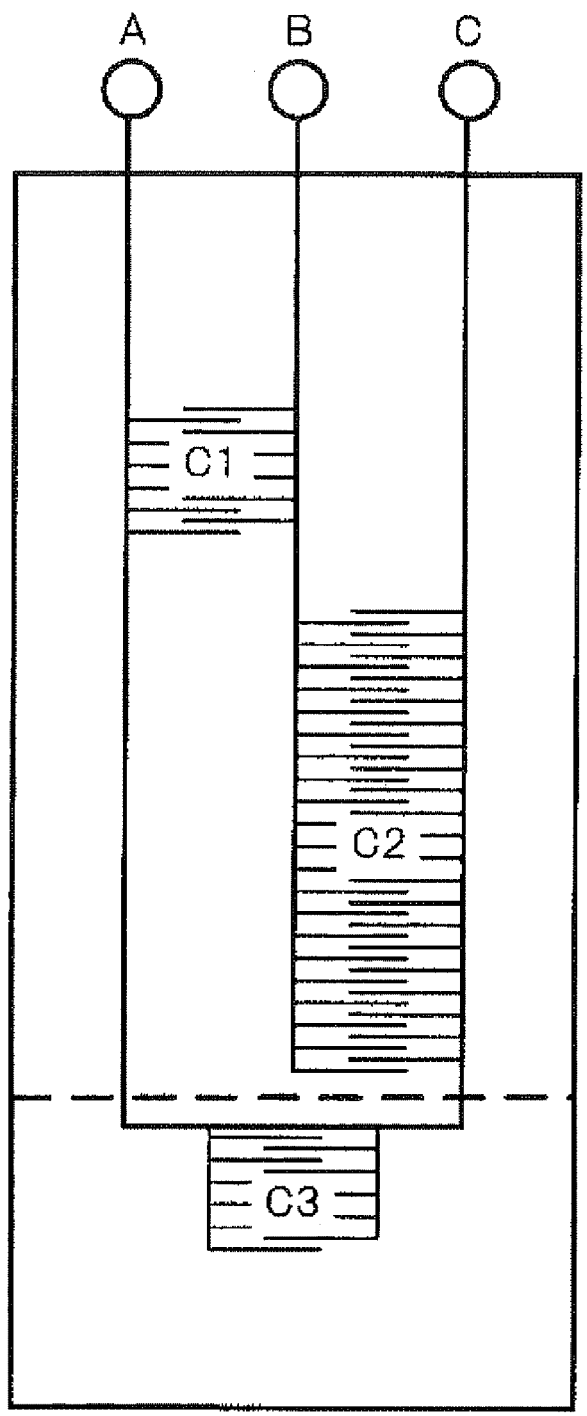
FIG. 2 is a diagram illustrating schematic structure of the liquid state detection sensor relating to the first exemplary embodiment of the present invention.
Figure 3:
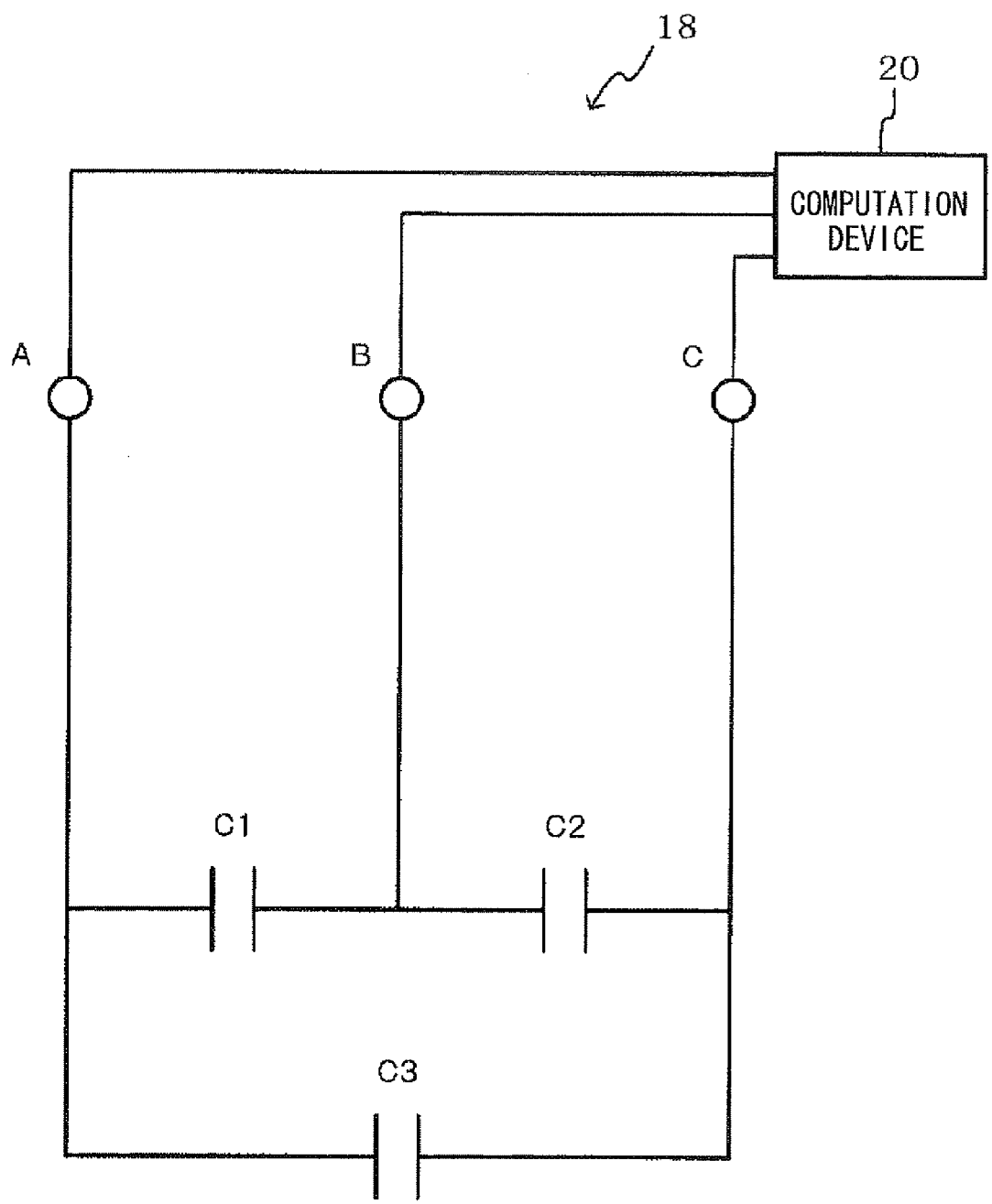
FIG. 3 is a circuit diagram illustrating circuit structure of the liquid state detection sensor relating to the first exemplary embodiment of the present invention.

FIG. 2 is a diagram illustrating schematic structure of the liquid state detection sensor 18 relating to the first exemplary embodiment of the present invention, and FIG. 3 is a circuit diagram illustrating circuit structure of the liquid state detection sensor 18 relating to the first exemplary embodiment of the present invention.

The liquid state detection sensor 18 of the first exemplary embodiment includes three terminals, terminals A, B and C, and is provided with three capacitors C1, C2 and C3 for detecting states of the fuel. The terminals A to C are connected to a computation device 20.

The capacitors C1 to C3 are each constituted by a pair of electrodes in a combtooth pattern, and charges may be charged and discharged between the pair of terminals.

More specifically, the capacitor C1 is provided between terminals A and B, the capacitor C2 is provided between terminals B and C, and the capacitor C3 is provided between terminals A and C.

As illustrated in FIG. 3, the electrical connections of the capacitors C1 to C3 are such that the capacitor C1 and the capacitor C2 are connected in series, and the capacitor C3 is connected in parallel with the series connection.

The capacitors C1 to C3 are disposed at respective positions such that the capacitance measurement areas do not interfere with one another. The capacitor C1 is disposed outside the fuel liquid at an upper side portion of the fuel tank 10 and serves as a vapor layer reference measurement portion, the capacitor C2 serves as a liquid level measurement portion that is partially or wholly immersed in the fuel depending on a remaining fuel amount in the fuel tank 10, and the capacitor C3 is disposed in the vicinity of the floor of the fuel tank 10 and serves as a fuel reference measurement portion.

That is, the liquid state detection sensor 18 is folded at the dotted line in FIG. 2 and disposed in the fuel tank 10. The capacitor C1 is charged with charge in accordance with the vapor layer, the capacitor C3 is charged with charge in accordance with characteristics of the fuel, and the capacitor C2 is charged with charge in accordance with a remaining amount (liquid level) of the fuel.

Next, a method of detection of a remaining fuel amount by the liquid state detection sensor 18 relating to the first exemplary embodiment of the present invention with the constitution described above is described.

When a remaining fuel amount in the fuel tank 10 is to be detected, in the present exemplary embodiment, capacitances between the terminals A and B, between the terminals B and C, and between the terminals A and C are measured.

A capacitance $C_{AB}$ between the terminals A and B, a capacitance $C_{BC}$ between the terminals B and C, and a capacitance $C_{AC}$ between the terminals A and C are found as illustrated in FIG. 4.

The charges with which the capacitors C1 to C3 have been charged may be found by measuring the capacitances between the pairs of terminals, substituting the capacitances into the expressions in FIG. 4, and solving the simultaneous equations.

Now, because a capacitance outside the fuel is known from the vapor layer reference measurement portion (the charge on the capacitor C1) and a capacitance inside the fuel is known from the fuel reference measurement portion (the charge on the capacitor C3), how much of the liquid level measurement portion is disposed inside the liquid may be calculated from capacitances thereof inside and outside the fuel. Thus, a remaining amount of the fuel may be calculated from the capacitance of the liquid level measurement portion (the charge on the capacitor C2).

Capacitances between the terminals shown in FIG. 4 are memorized in advance in the computation device 20, and measurement results of the liquid state detection sensor 18 are saved to the computation device 20. Hence, capacitances of the capacitors C1 to C3 may be measured by the computation device 20 and remaining fuel amounts may be detected.

Thus, in the present exemplary embodiment, three kinds of liquid state may be detected by the three capacitance measurement portions provided between pairs of the three terminals, and a maximum number of detection objects may be detected with a small number of terminals.

Second Exemplary Embodiment

Figure 5:
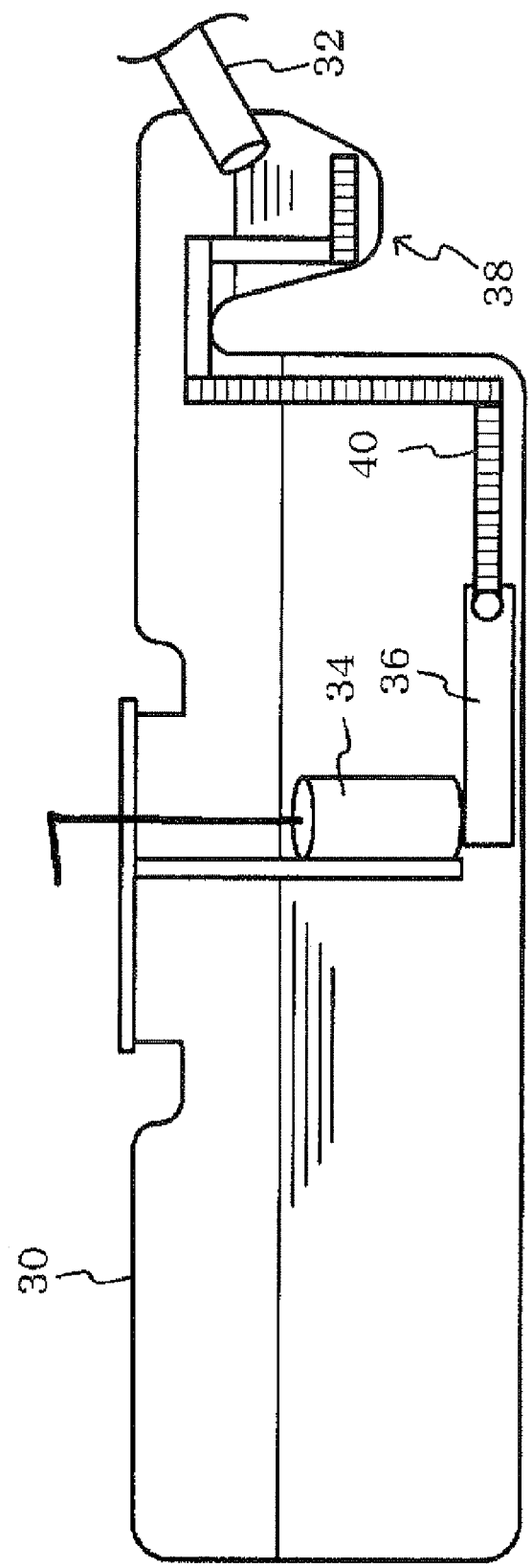
FIG. 5 is a diagram illustrating schematic structure of a fuel tank provided with a liquid state detection sensor relating to a second exemplary embodiment of the present invention.

Next, a liquid state detection sensor relating to the second exemplary embodiment of the present invention is described. FIG. 5 is a diagram illustrating schematic structure of a fuel tank 30 provided with the liquid state detection sensor relating to the second exemplary embodiment of the present invention.

Similarly to the first exemplary embodiment, fuel in a liquid form to be used in an automobile or the like is stored in the fuel tank 30. The fuel stored in the fuel tank 30 is supplied from a fuelling pipe 32 that is connected to the fuel tank 30. The fuel stored in the fuel tank 30 is drawn up through a fuel pump 34 provided in the fuel tank 30 and supplied to an internal combustion engine such as an automobile engine or the like.

A filter 36 is provided at the fuel pump 34. By the fuel being drawn up through the filter 36, clogging of the fuel pump 34 or the like is suppressed.

A liquid layer 38 for temporarily storing fuel supplied through the fuelling pipe 32 is formed at the fuel tank 30 of the present exemplary embodiment, and the fuel supplied through the fuelling pipe 32 is temporarily stored in the liquid layer 38. More specifically, the liquid layer 38 is disposed at a location higher than a full-tank liquid surface of the fuel tank 30. Supplied fuel is temporarily stored in the liquid layer 38, after which amounts of the fuel overflowing from the liquid layer 38 are stored in the fuel tank 30. Thus, only fuel that has been supplied to the liquid layer 38 is stored.

A liquid state detection sensor 40 relating to the second exemplary embodiment of the present invention is disposed in the fuel tank 30. In the present exemplary embodiment, as well as a remaining amount of fuel stored in the fuel tank 30, the liquid state detection sensor 40 detects plural kinds of state, such as the kind of fuel, internal pressure in the fuel tank 30, the temperature of the fuel, and the like.

Figure 6:
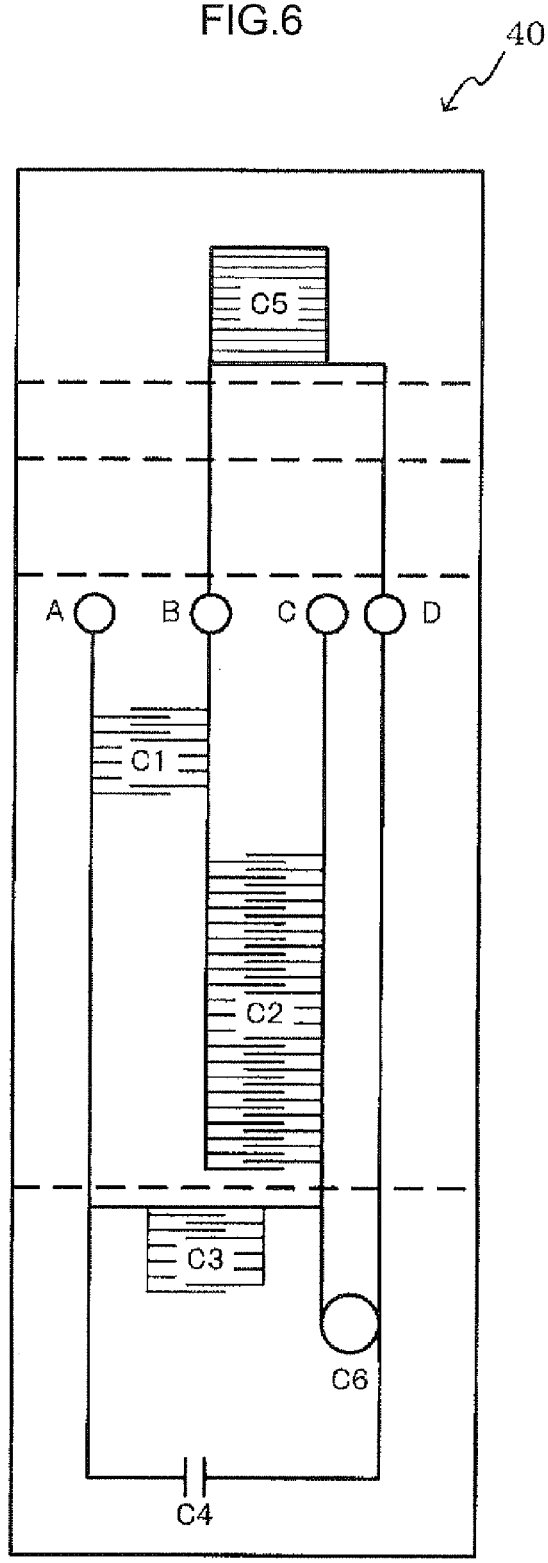
FIG. 6 is a diagram illustrating schematic structure of the liquid state detection sensor relating to the second exemplary embodiment of the present invention.
Figure 7:
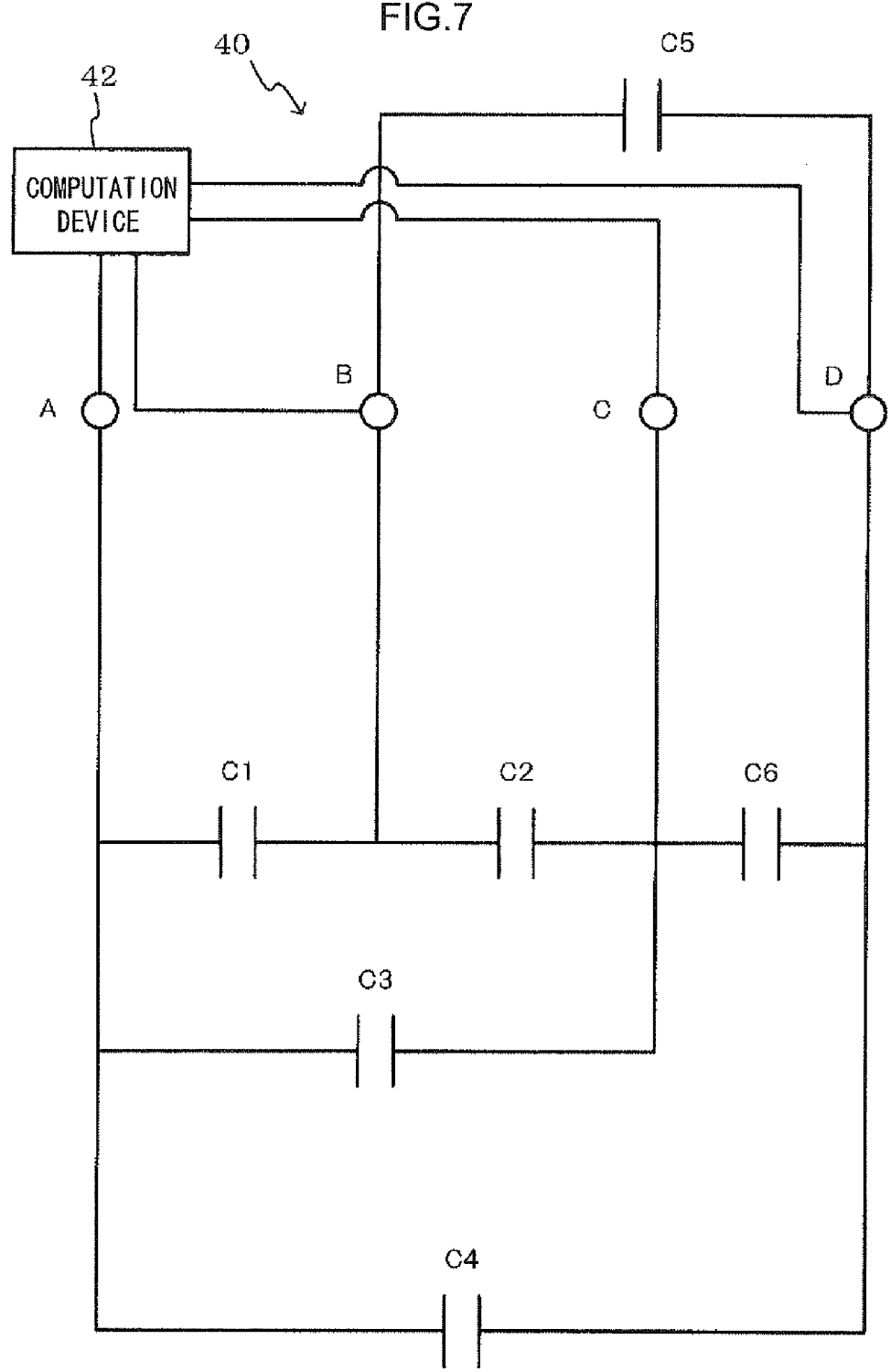
FIG. 7 is a circuit diagram illustrating circuit structure of the liquid state detection sensor relating to the second exemplary embodiment of the present invention.

FIG. 6 is a diagram illustrating schematic structure of the liquid state detection sensor 40 relating to the second exemplary embodiment of the present invention, and FIG. 7 is a circuit diagram illustrating circuit structure of the liquid state detection sensor 40 relating to the second exemplary embodiment of the present invention.

The liquid state detection sensor 40 relating to the second exemplary embodiment includes four terminals, terminals A to D, and is provided with six capacitors C1 to C6 for detecting the various states of the fuel. The terminals A to D are connected to a computation device 42.

The capacitors C1, C2, C3 and C5 are each constituted by a pair of electrodes in a combtooth pattern, and charges may be charged and discharged between the pair of terminals.

A capacitor whose capacitance varies with temperature is used for the capacitor C4, and a capacitor whose capacitance varies with pressure is used for the capacitor C6. The capacitors C4 and C6 may be formed as pairs of electrodes with combtooth shapes, but other constitutions are also applicable.

More specifically, the capacitor C1 is provided between terminals A and B, the capacitor C2 is provided between terminals B and C, the capacitor C3 is provided between terminals A and C, the capacitor C4 is provided between terminals A and D, the capacitor C5 is provided between terminals B and D, and the capacitor C6 is provided between terminals C and D.

As illustrated in FIG. 7, the electrical connections of the capacitors C1 to C6 are such that the capacitors C1, C2 and C6 are connected in series, and the capacitor C4 is connected in parallel with the series connection.

The capacitor C3 is connected in parallel with the series connection of the capacitor C1 and the capacitor C2, and the capacitor C5 is connected in parallel with the series connection of the capacitor C2 and the capacitor C6.

Similarly to the first exemplary embodiment, the capacitors C1 to C6 are disposed at respective positions such that the capacitance measurement areas do not interfere with one another. The capacitor C1 is disposed outside the fuel liquid at an upper side portion of the fuel tank 30 and serves as a vapor layer reference measurement portion, the capacitor C2 serves as a liquid level measurement portion that is partially or wholly immersed in the fuel depending on a remaining fuel amount in the fuel tank 30, and the capacitor C3 is disposed in the vicinity of the floor of the fuel tank 30 and serves as a fuel reference measurement portion.

The capacitor C4 is disposed at the interior of the filter 36 and serves as a temperature measurement portion, the capacitor C5 is disposed in the liquid layer 38 and serves as a supplied fuel characteristic measurement portion, and the capacitor C6 is disposed at the interior of the filter 36 and serves as a filter internal pressure measurement portion.

That is, the liquid state detection sensor 40 is folded at the dotted line in FIG. 6 and disposed in the fuel tank 30 so as to extend from a floor face in the fuel tank 30 along a wall face to the liquid layer 38. The capacitor C1 is charged with charge in accordance with the vapor layer, the capacitor C2 is charged with charge in accordance with a remaining amount (liquid level) of the fuel, the capacitor C3 is charged with charge in accordance with characteristics of the fuel, the capacitor C4 is charged with charge in accordance with a temperature of the fuel, the capacitor C5 is charged with charge in accordance with a type of fuel (a fuel characteristic), and the capacitor C6 is charged with charge in accordance with internal pressure in the filter 36.

Next, a method of detection of various liquid states by the liquid state detection sensor 40 relating to the second exemplary embodiment of the present invention with the constitution described above is described.

When the various states of the fuel in the fuel tank 30 are to be detected, in the present exemplary embodiment, capacitances between the terminals A and B, the terminals A and C, the terminals A and D, the terminals B and C, the terminals B and D, and the terminals C and D are measured.

Similarly to the first exemplary embodiment, calculation of expressions for finding capacitances between the respective pairs of terminals is described. The capacitances between the respective pairs of terminals are more complicated than in the first exemplary embodiment. Therefore, as an example, how the capacitance between terminals A and B is found is described. FIG. 8 is a diagram for describing the method of calculating the capacitance between terminals A and B of the liquid state detection sensor relating to the second exemplary embodiment of the present invention.

Extracting the pair of terminals A and B (from the top side of FIG. 8), the terminal pair A-B may be represented by the circuit diagram illustrated in the middle of FIG. 8. If the area encircled by the dotted line is subjected to a Δ-Y conversion, it is converted to the capacitances Ca, Cb, and Cc as shown at the bottom side of FIG. 8. The converted capacitances Ca, Cb, and Cc are expressed by the expressions shown below.

$$Ca=(C3C4+C4C6+C3C6)/C6$$

$$Cb=(C3C4+C4C6+C3C6)/C4$$

$$Cc=(C3C4+C4C6+C3C6)/C3$$

Using these expressions, a compound capacitance C(b,2) of the capacitor Cb and the capacitor C2, a compound capacitance C(c,5) of the capacitor Cc and the capacitor C5, a compound capacitance C(b,2,c,5) of the capacitor Cb, the capacitor C2, the capacitor Cc and the capacitor C5, and a compound capacitance C(a,b,2,c,5) of the capacitor Ca, the capacitor Cb, the capacitor C2, the capacitor Cc and the capacitor C5 are found, in that order.

Then, when a final compound capacitance C (1,2,3,4,5,6) between terminals A and B is found, it is as in the following expression. Thus, the capacitance between terminals A and B may be expressed by this expression.

$$C(1, 2, 3, 4, 5, 6) = C1 + C(a, b, 2, c, 5)$$
$$= C1 + \frac{\frac{CaCbC2}{Cb+C2} + \frac{CaCcC5}{Cc+C5}}{Ca + \frac{CbC2}{Cb+C2} + \frac{CcC5}{Cc+C5}}$$

The capacitances between the other pairs of terminals may be found by similar computations, but details are not given here.

Thus, similarly to the first exemplary embodiment, capacitances between the respective terminal pairs are measured and saved to the computation device 42. Hence, the charges with which the capacitors C1 to C6 have been charged may be found by substituting the capacitances into the expressions representing the capacitances between the respective terminal pairs in the computation device 42 and solving the simultaneous equations. Therefore, in the present exemplary embodiment, as illustrated in FIG. 9, the detection objects may be detected by the respective measurement portions (the capacitors C1 to C6) of the liquid state detection sensor 40.

Specifically, because a capacitance outside the fuel is known from the vapor layer reference measurement portion (the capacitor C1) and a capacitance inside the fuel is known from the fuel reference measurement portion (the charge on the capacitor C3), how much of the liquid level measurement portion is disposed inside the liquid may be calculated from capacitances thereof inside and outside the fuel. Thus, a remaining amount of the fuel may be calculated from the capacitance of the liquid level measurement portion (the charge on the capacitor C2).

Figure 10:
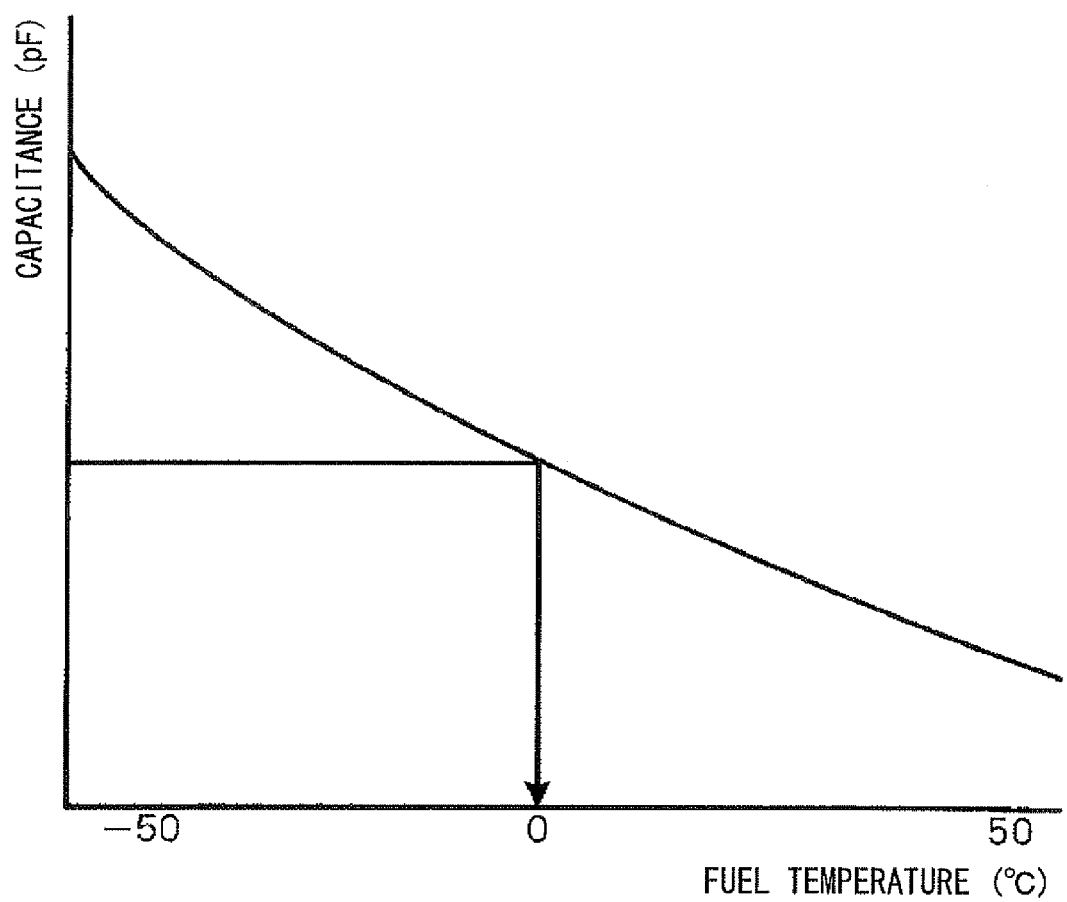
FIG. 10 is a graph illustrating an example of a relationship between fuel temperature and capacitance.

Further, because the capacitance of the temperature measurement portion (the capacitor C4) is known, the temperature of the fuel in the fuel tank 30 may be measured, by temperatures corresponding to capacitances having been previously measured and memorized at the computation device 42. For example, a relationship between fuel temperature and capacitance, as illustrated in FIG. 10, is measured beforehand and pre-memorized in the computation device 42. Hence, the temperature of the fuel may be detected by reading out a fuel temperature corresponding to a measured capacitance.

Because the capacitance of the supplied fuel characteristic measurement portion (the capacitor C5) is known, a type and temperature or the like of fuel in the liquid layer 38 may be measured, by types and temperatures of fuels or the like that correspond to capacitances having been specified beforehand. For example, the relationship between fuel temperature and capacitance is measured beforehand, as illustrated in FIG. 10, and memorized at the computation device 42 and, as illustrated in FIG. 11, relationships between capacitance and alcohol concentration are specified beforehand and memorized at the computation device 42. Thus, the fuel temperature corresponding to a measured capacitance may be found, and an alcohol concentration in the fuel may be detected by reading out an alcohol concentration in accordance with the fuel temperature that has been found and the measured capacitance. Hence, the type of fuel may be identified from the alcohol concentration. In an ordinary fuel tank, supplied fuels are mixed in the fuel tank, and accurate characteristics of the fuels may not be accurately detected. In the present exemplary embodiment, however, because the liquid layer 38 is disposed at a position higher than the full-tank liquid surface of the fuel tank 30 and temporarily stores supplied fuel, misfuelling of a fuel may be detected, generally regardless of the amount of fuel supplied.

Because the capacitance of the pressure measurement portion (the capacitor C6) is known, a pressure in the filter 36 may be detected by a relationship between capacitance and pressure having been measured beforehand and memorized at the computation device 42, and a pressure corresponding to the measured capacitance being read out. Accordingly, if the pressure is beyond a pre-specified pressure range, then clogging or the like of the filter 36, the fuel pump 34 or the like is likely. Thus, clogging of the filter 36 and the fuel pump 34 or the like may be detected.

Thus, in the present exemplary embodiment, six kinds of liquid state may be detected by the six capacitance measurement portions provided between the respective pairs of the four terminals, and a maximum number of detection objects may be detected with a small number of terminals.

In the exemplary embodiments described above, a configuration of three terminals and three capacitance measurement portions is described for the first exemplary embodiment and a configuration of four terminals and six capacitance measurement portions is described for the second exemplary embodiment, but this is not limiting. For example, to generalize, if the number of terminals is N (N being a natural number that is at least 3), a total number of combinations $_NC_2 = N!/(2 \times (N-2)!)$ of detection patterns is possible. That is, with N=3 (the first exemplary embodiment), there are C=3!/(2×(3−2)!)=3 patterns, and with N=4 (the second exemplary embodiment), there are C=4!/(2×(4−2)!)=6 patterns. Thus, detection terminals in a number corresponding to a number of patterns may detect a maximum number of detection objects by electrostatic capacitances with areas that do not interfere with one another being provided between the terminals. Note that the total number of combinations $_NC_2$ represents the number of combinations of selections of pairs from N. The detection objects may be objects that are the same and may be objects that are different.

The invention claimed is:
1. A liquid state detection sensor comprising:
n terminals, n being a natural number that is at least 3; and
at least n capacitance measurement portions provided between the terminals of respectively different combinations of the terminals, wherein the capacitance measurement portions are disposed on a single board, and the capacitance measurement portions include:
a first capacitance measurement portion that is permanently disposed within a measured liquid in a fuel tank;
a second capacitance measurement portion that is for measuring a liquid level of the measured liquid; and
a third capacitance measurement portion that is permanently disposed outside the measured liquid.
2. The liquid state detection sensor according to claim 1, wherein the capacitance measurement portions are provided between all combinations of the terminals, {n!/(2×(n−2)!)} of the capacitance measurement portions being provided.
3. The liquid state detection sensor according to claim 1, wherein the capacitance measurement portions further include a fourth capacitance measurement portion that is disposed at a liquid layer that is formed at the fuel tank for temporarily storing supplied fuel.
4. The liquid state detection sensor according to claim 1, wherein the capacitance measurement portions further include a fifth capacitance measurement portion that detects a temperature of fuel in the fuel tank.

5. The liquid state detection sensor according to claim 4, further comprising a computation device configured to:
   memorize pre-specified relationships between capacitances detected by the fifth capacitance measurement portion, temperatures of the fuel, and alcohol concentrations contained in the fuel,
   find a temperature of the fuel on the basis of a capacitance detected by the fifth capacitance measurement portion, and
   calculate an alcohol concentration on the basis of the found temperature of the fuel and the capacitance detected by the fifth capacitance measurement portion.

6. The liquid state detection sensor according to claim 1, wherein the capacitance measurement portions further include a sixth capacitance measurement portion that detects a pressure from a change in capacitance due to a change in separation between a pair of terminals.

* * * * *